(12) United States Patent
Park et al.

(10) Patent No.: US 9,921,323 B2
(45) Date of Patent: Mar. 20, 2018

(54) FOLDABLE-FIXING TYPE 3D SEISMIC SURVEY APPARATUS FOR SMALL SHIP, AND METHOD OF SEISMIC SURVEY USING THE SAME

(71) Applicants: GeoView Co. Ltd., Busan (KR); Korea Institute of Geoscience and Mineral Resources, Daejeon (KR)

(72) Inventors: Chan-ho Park, Gyunggi-do (KR); Won-sik Kim, Daegu (KR); Hyun-do Kim, Busan (KR); Seong-pil Kim, Gyungsangbuk-do (KR)

(73) Assignees: GEO-VIEW CO. LTD., Busan (KR); KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 15/224,037

(22) Filed: Jul. 29, 2016

(65) Prior Publication Data

US 2017/0097427 A1    Apr. 6, 2017

(30) Foreign Application Priority Data

Oct. 1, 2015    (KR) ........................ 10-2015-0138790

(51) Int. Cl.
*G01V 1/38*    (2006.01)
*G01V 1/20*    (2006.01)

(52) U.S. Cl.
CPC ............ *G01V 1/201* (2013.01); *G01V 1/3808* (2013.01); *G01V 1/3835* (2013.01); *G01V 1/3843* (2013.01)

(58) Field of Classification Search
CPC .... G01V 1/201; G01V 1/3808; G01V 1/3835; G01V 1/3843
(Continued)

(56) References Cited

U.S. PATENT DOCUMENTS 8,107,323 B1 *    1/2012    Kim ...................... G01V 1/159
367/165

FOREIGN PATENT DOCUMENTS

KR    10-2009-0011344    2/2009
KR       10-1016014     2/2011
(Continued)

OTHER PUBLICATIONS

Missianen, Tine, "VHR marine 3D seismics for shallow water investigations: Some Practical Guidelines", Marine Geophysical Researches, vol. 26, pp. 145-155, 2005.

*Primary Examiner* — Daniel L Murphy
(74) *Attorney, Agent, or Firm* — Dentons US LLP

(57) ABSTRACT

The present invention relates to a 3D seismic marine survey apparatus. More particularly, it relates to a foldable-fixing type 3D seismic survey apparatus for a small ship and a method of 3D seismic survey using the foldable-fixing type 3D seismic survey apparatus. The foldable-fixing type 3D seismic survey apparatus for a small ship includes: a seismic wave generator; and a seismic unit that includes a plurality of floating board units, and foldable fixing-frames connecting and fixing the floating board units to each other in a floating board array such that relative positions of the floating board units are fixed, and being folded for transporting and unfolded for installing, in which the seismic unit receives 3D seismic waves while being towed behind the seismic wave generator after being moved and unfolded at a survey location.

11 Claims, 15 Drawing Sheets

(58) Field of Classification Search
USPC .......................................................... 367/15
See application file for complete search history.

(56) References Cited

FOREIGN PATENT DOCUMENTS

| | | | | |
|---|---|---|---|---|
| KR | 1039146 | | 5/2011 | |
| KR | 10-2012-0076952 A | | 10/2012 | |
| KR | 10-1230040 | | 2/2013 | |
| KR | 10-2013-0134822 A | | 10/2013 | |
| KR | 10-2014-0088674 | | 7/2014 | |
| KR | 1521857 | | 5/2015 | |
| WO | WO 2016007505 A1 | * | 1/2016 | ........... G01V 1/3808 |

* cited by examiner

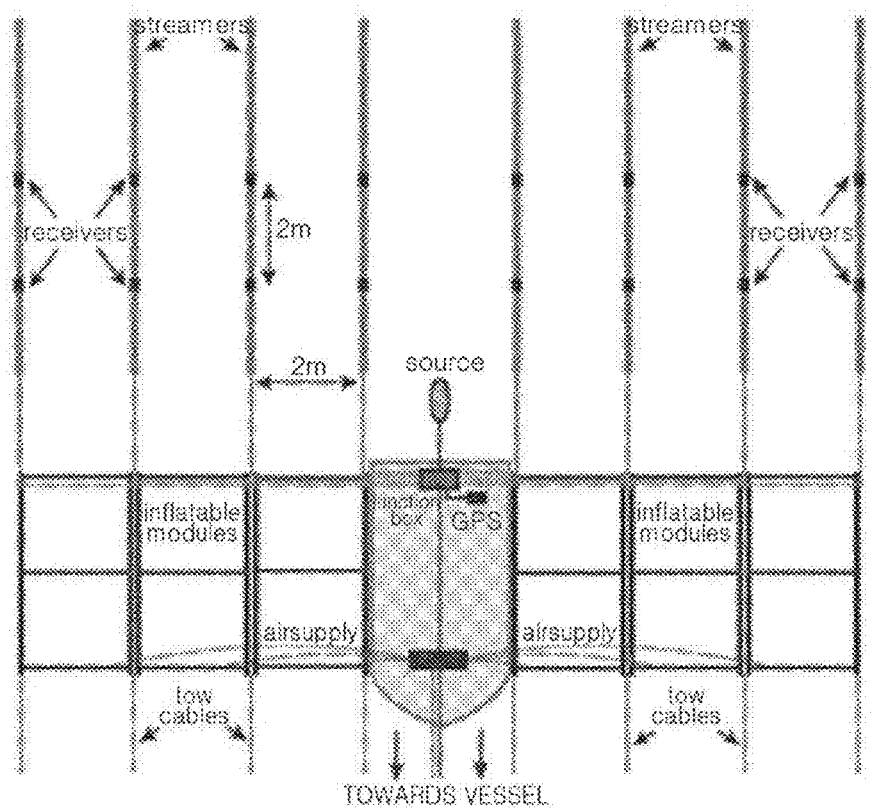
PRIOR ART FIGURE 2A (L)

FOLDABLE-FIXING TYPE 3D SEISMIC SURVEY APPARATUS FOR SMALL SHIP, AND METHOD OF SEISMIC SURVEY USING THE SAME

CROSS REFERENCE TO RELATED APPLICATION

The present application claims priority to Korean Patent Application No. 10-2015-0138790, filed Oct. 1, 2015, the entire contents of which is incorporated herein for all purposes by this reference.

BACKGROUND OF THE INVENTION

Field of the Invention

The present invention relates to a marine 3D seismic survey apparatus. More particularly, it relates to a foldable-fixing type 3D seismic survey apparatus for a small ship, whereby the apparatus is able to fix relative positions of seismometers to locate each other with a small number of GPS devices, allows a survey ship to vertically and horizontally extend, and can be easily loaded and transported in a predetermined space on a vehicle by being folded, and a method of 3D seismic survey using the foldable-fixing type 3D seismic survey apparatus.

Description of the Related Art

In general, a marine seismic survey is performed while a survey ship travels with a source generating seismic waves and a streamer equipped with a seismometer sequentially towed behind the stern of the survey ship and periodically generates seismic waves from the source. Further, the marine seismic survey obtains marine information by analyzing the seismic waves reaching the seismometer after being reflected from the see floor.

For such a seismic survey, equipment such as an OBC (Ocean Bottom Cable Type) streamer disclosed in Korean Patent Application Publication No. 10-2012-0076952, a streamer having blades, a protective case, a retainer, and an undersea level maintainer etc. disclosed in Korean Patent Application Publication No. 10-2013-0134822, and a multi channel seismic survey apparatus disclosed in Korean Patent No. 10-1016014 are used, and a technology of converting data obtained from received seismic waves into an ODCE file disclosed in Korean Patent No. 10-1230040 is applied.

Seismic surveys are classified into a large-ship survey and a small-ship survey by the sizes of ships that are used. Further, when there is one streamer that is an array of seismometers, it is called a 2D survey, and when there are two or more streamers, it is called a 3D survey.

FIGS. 1A and 1B are respectively schematic views of 2D and 3D seismic surveys.

A 2D survey, as shown in FIG. 1A, obtains information about a 2D cross-section for a virtual plan including a source and a streamer, but a 3D survey, as shown in FIG. 1B, obtains 3D information from the point of time when acquiring data. Accordingly, the 3D survey can image complicated structures, as compared with the 2D survey, but requires a large ship to tow many pieces of equipment and obtain accurate location information of the equipment.

However, using a large ship may be impossible to perform a normal survey for areas with a small depth of the sea or for places where fishing nets, fishing implements, and ships frequently come and go. Therefore, it may be technically meaningful to obtain a 3D image through a small-ship survey.

Such an attempt has been made at abroad and FIGS. 2A and 2B show an example of a 3D seismic survey apparatus using a small ship in the related art, disclosed in VHR marine 3D seismics for shallow water investigations Some practical guidelines (Springer 2005 Tine Missiaen). A 3D seismic survey apparatus using a small ship, as shown in FIG. 2A, acquires 3D seismic survey data while towing several 8 m streamers having a 2 m gap therebetween.

FIG. 2B shows a survey process using a 3D seismic survey apparatus for a small ship that has this configuration. In FIG. 2B, the upper picture shows a survey on a river and the lower picture shows a survey at sea. As can be seen from the two pictures in FIG. 2B, the gaps between the streamers are not uniform as indicated by the arrows. This non-uniformity of streamers occurred around seacoast areas with currents, so the apparatus failed to obtain a precise 3D seismic image.

Misseian et al. who conducted the survey explained the reason, saying the apparatus failed to maintain the gaps between seismometers uniform due to currents around the seacoast. This may be considered reasonable because although a survey using a large ship can be performed quickly at a speed of about 5 knots as compared with using a small ship (2~3 knots generally for a small ship), large ships can strongly tow streamers of several to hundreds of kilometers, and the relative positions between seismometers can be fixed by the tension in the streamers themselves. However, it is difficult to expect this effect from short streamers that small ships can tow.

Accordingly, this problem should be solved for a 3D seismic survey using a small ship.

The applicant(s) of the present invention has proposed '3 dimension seismic exploration apparatus and method in small ships' as disclosed in Korean Patent Application No. 10-2014-0152208, in which the apparatus includes a seismic wave generator towed behind the stern of a small ship, a pair of support bars extending the small ship in the traveling direction at the rear portion of the seismic wave generator by being connected to the stern of the small ship, and a plurality of streamers coupled between the support bars and arranged in the traveling direction of the small ship, in order to perform a 3D seismic survey using a small ship by maintaining uniform gaps and undersea positions even for short streamers and to perform an accurate 3D seismic survey using a small ship by fixing short streamers at predetermined positions with respect to seismometers and the seismic wave generator even against currents.

This method has the advantage that it is possible to largely extend the streamers in the survey direction in a survey using a small ship, but four or more GPS devices are basically required to find out the relative positions of the seismometers. Thus, in terms of an electric/electronic aspect of system, a signal processing system having a large memory is required for such GPS devices. That is, a large processing system is required for many GPS devices for locating seismometers due to the flexibility of the streamers when a current is severe, and the system is not integrated with the seismometer devices, thus the system is likely to need to be disassembled for transporting and stowing and assembled again for surveying later.

The foregoing is intended merely to aid in the understanding of the background of the present invention, and is not intended to mean that the present invention falls within the purview of the related art that is already known to those skilled in the art.

DOCUMENTS OF RELATED ART

Patent Documents (Patent Document 1) Korean Patent Application Publication No. 10-2012-0076952,
(Patent Document 2) Korean Patent Application Publication No. 10-2013-0134822,
(Patent Document 3) Korean Patent No. 10-1016014,
(Patent Document 4) Korean Patent No. 10-1230040, and
(Patent Document 5) Korean Patent Application No. 10-2014-0152208

SUMMARY OF THE INVENTION

The present invention has been made in an effort to solve the problems of the conventional 3D seismic survey apparatus and an object of the present invention is to provide a foldable-fixing type 3D seismic survey apparatus for a small ship, whereby the foldable-fixing type 3D seismic survey apparatus can solve the basic problem of non-uniformity of gaps between streamers due to flexibility of the streamers that are formed in the shape of a rubber hose to function as a protective equipment capable of blocking water currents in a traveling direction for a survey in the related art by using a foldable fixing-structure instead of hose-shaped streamers that are towed and used for surveys in the related art, and a method of 3D seismic survey using the foldable-fixing type 3D seismic survey apparatus.

Another object of the present invention is to provide a foldable-fixing type 3D seismic survey apparatus for a small ship, whereby the apparatus makes it possible to reduce the number of GPS devices by fixing relative positions of seismometers in order to remove difficulty due to non-uniform relative positions of seismometers when a system using existing streamers performs a seismic survey, and a limit in a survey due to fishing instruments in shallow areas of the sea, and that can accurately and easily perform a 3D seismic survey using a small ship in shallow areas and narrow areas with many fishing nets and fishing instruments by basically removing the problem of entangling or twisting of long streamers, which have been used for 3D seismic survey apparatuses, by fixing relative positions of the streamers, and a method of 3D seismic survey using the foldable-fixing type 3D seismic survey apparatus.

Another object of the present invention is to provide a foldable-fixing type 3D seismic survey apparatus for a small ship, whereby the apparatus can perform a 3D seismic survey with a small ship in shallow areas and narrow areas and that can collect as many image signals as existing 3D seismic survey apparatuses using streamers, by providing extendibility in a traveling direction (inline direction) of a survey ship or a perpendicular direction to the traveling direction (crossline direction) using a foldable fixing-frame instead of existing streamers that cannot provide extendibility in the perpendicular direction to the traveling direction of a survey ship, and a method of 3D seismic survey using the foldable-fixing type 3D seismic survey apparatus.

Another object of the present invention is to provide a foldable-fixing type 3D seismic survey apparatus for a small ship, whereby the apparatus can be folded to fit to the size of a loading space of a vehicle to transport the apparatus so that the apparatus can be easily transported by common vehicles without disassembling, and that can again perform a 3D seismic survey without reassembling in an area to survey by being unfolded, a method of 3D seismic survey using the foldable-fixing type 3D seismic survey apparatus.

Another object of the present invention is to provide a foldable-fixing type 3D seismic survey apparatus for a small ship, whereby the apparatus is practical for acquiring seismic data and providing images, and that can be easily transported and stowed even by common vehicles, and a method of 3D seismic survey using the foldable-fixing type 3D seismic survey apparatus.

In order to achieve the above object, according to one aspect of the present invention, there is provided a foldable-fixing type 3D seismic survey apparatus for a small ship, the apparatus including: a seismic wave generator being towed from the stern of the small ship and generating seismic waves; and a seismic unit including: a plurality of floating board units equipped with one or more seismometer units on bottoms thereof to be submerged in water; and foldable fixing-frames connecting and fixing the floating board units to each other in a floating board unit array such that relative positions of the floating board units are fixed, and being folded for transporting and being unfolded for installing, and receiving 3D seismic waves while being towed behind the seismic wave generator after being moved and unfolded at a survey location.

The seismic wave generator and the seismic unit may be connected and fixed to the small ship with relative positions to the small ship fixed.

The floating board unit may include: a floating board made of a floating material in a plate shape; seismometer units mounted on a bottom of the floating board to be submerged in water during a 3D seismic survey and receiving 3D seismic waves reflected off the seafloor; a fixing-frame base disposed on a top of the floating board to fix the fixing-frame; and one or more board GPS devices respectively disposed on one or more of the floating boards.

Three or more floating board units may be provided to acquire a 3D seismic wave image.

The seismometer unit may include: a seismometer retainer having a plurality of seismometer holes where seismometers are disposed; and the seismometers disposed in the seismometer holes.

The seismometer holes may be formed in conical shapes at inlets to collect seismic waves reflected off the seafloor.

In order to extend as much as a multiple of the number of seismic survey channels corresponding to the number of the seismometers, the seismic unit may include: a lateral coupling part including one or more lateral extension bar holders and disposed on outermost floating boards; and one or more lateral extension bars coupled to the lateral extension bar holders to extend the seismic unit in a direction perpendicular to a traveling direction of a ship.

In order to extend as much as a multiple of the number of seismic survey channels corresponding to the number of the seismometers, the seismic unit may include: longitudinal coupling parts including one or more longitudinal extension bar holders disposed at front and rear portions of each of outermost floating boards; and one or more longitudinal extension bars coupled to the longitudinal extension bar holders to extend the seismic unit in a traveling direction of a ship.

The foldable fixing-frame may include: two or more fixing bars 210 separated into several parts; support bars orthogonally connected among two or more steel pipes; and a folding part including a hinge portion formed for folding and unfolding at a separate end of one of the fixing bars, bolt portions formed at separate ends of the other fixing bars, and a sliding nut pipe fitted on any one of the bolt portions, in which the two or more steel pipes are positioned at longitudinal edges of the fixing-frame.

The folding parts may be adjusted in gap to fit to a size of a truck for loading, and the seismometers may be adjusted in gap to fit to the sizes floating boards and a truck for loading, and are attached.

According to another aspect of the present invention, there is provided a method of a 3D seismic survey using a foldable-fixing type 3D seismic survey apparatus for a small ship, the apparatus including: a seismic wave generator being towed from a stern of the small ship and generating seismic waves; and a seismic unit including: a plurality of floating board units equipped with one or more seismometer units on bottoms thereof to be submerged in water; and foldable fixing-frames connecting and fixing the floating board units to each other in a floating board unit array such that relative positions of the floating board units are fixed, and being folded for transporting and being unfolded for installing, and receiving 3D seismic waves while being towed behind the seismic wave generator after being moved and unfolded at a survey location, the method including: 3D seismic wave-transmitting & receiving in which 3D seismic waves are transmitted and received while towing the seismic wave generator and the seismic unit with the small ship; and 3D seismic wave-analyzing in which submarine topography information is acquired by analyzing received 3D seismic waves using fixed relative positions between the small ship and the floating boards and information of board GPS devices on the seismic unit.

3D seismic wave-analyzing may be performed using GPS information of one of the GPS devices on the seismic unit and ship GPS information of the small ship, or using GPS information of two or more board GPS devices on the seismic unit.

According to the present invention, the foldable-fixing type 3D seismic survey apparatus can be folded to be transported and can be unfolded to install a 3D seismic survey location, and when the apparatus is folded, the apparatus can be sufficiently loaded and transported by a small truck such as 1 to 1.4 ton trucks. Accordingly, it is possible to very easily transport and install the foldable-fixing type 3D seismic survey apparatus.

Further, since short floating boards are fixed with a rigid structure that maintains relative positions to be towed by a small ship, and seismic waves are received with the seismic unit is submerged in water, inflow of noise can be minimized. Accordingly, it is possible to use a small ship to accurately and easily acquire information about a 3D submarine structure.

Further, according to the present invention, since it is possible to perform a 3D seismic survey using a small ship, it is possible to easily perform a 3D seismic survey in areas that have been difficult to approach with a large ship and of which the information has been difficult to acquire.

Further, according to the present invention, since a 3D seismic survey is performed with the relative position, between the floating boards of the seismic unit and a small ship for towing, fixed, as compared with 3D seismic surveys of the related art, it is possible to perform a 3D seismic survey for the submarine topography in a narrow sea area using a small number of GPS devices, so it is possible to easily acquire 3D information about the seafloor. Accordingly, it is possible to easily acquire and use 3D information about the seafloor in the coming ocean age.

Further, according to the present invention, since a seismic unit having n seismic survey channels (n seismometers) can be extended in a traveling direction or in a direction perpendicular to the traveling direction, it is possible to extend the seismic survey channels to a multiple of the n seismic survey channels of the seismic unit. Therefore, it is possible to remarkably increase efficiency of a 3D seismic survey using a small ship in a narrow sea area.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A and 2B are views showing the configuration of a foldable seismic survey apparatus for a small ship in the related art;

DETAILED DESCRIPTION OF THE INVENTION

Hereinafter, the present invention will be described in detail with reference to the accompanying drawings showing embodiments of the present invention.

Further, in describing the present invention, detailed descriptions of well-known functions or configurations relating to the present invention will not be provided so as not to obscure the description of the present invention with unnecessary details.

Reference will now be made in detail to various embodiments of the present invention, specific examples of which are illustrated in the accompanying drawings and described below, since the embodiments of the present invention can be variously modified in many different forms. However, it should be understood that embodiments according to spirit of the present invention are not limited to the specific embodiments, but include all modifications, equivalents, and substitutions included in the spirit and the scope of the present invention.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, other expressions describing the relationships of components, that is, "between" and "directly between", or "close to" and "directly close to" should be understood in the same way.

Terms used in the present specification are used only in order to describe specific exemplary embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 1A:
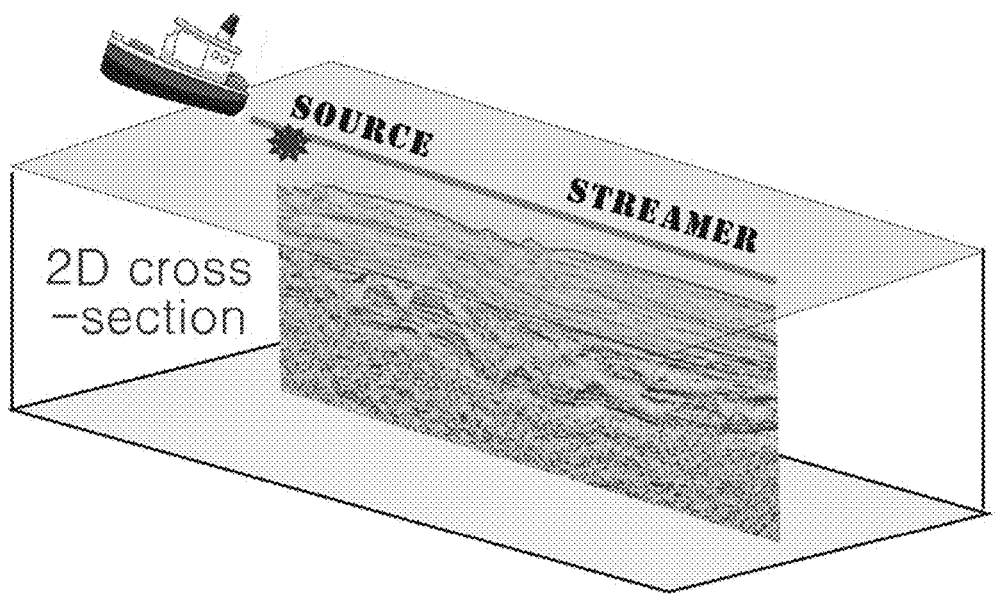
FIGS. 1A and 1B are respective schematic views of 2D and 3D seismic surveys.
Figure 1B:
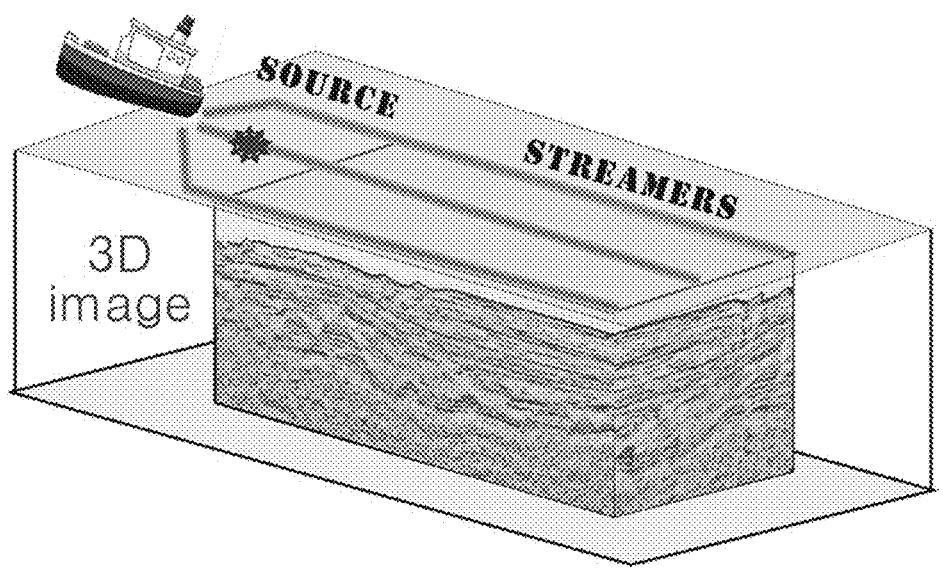
Figure 2B:
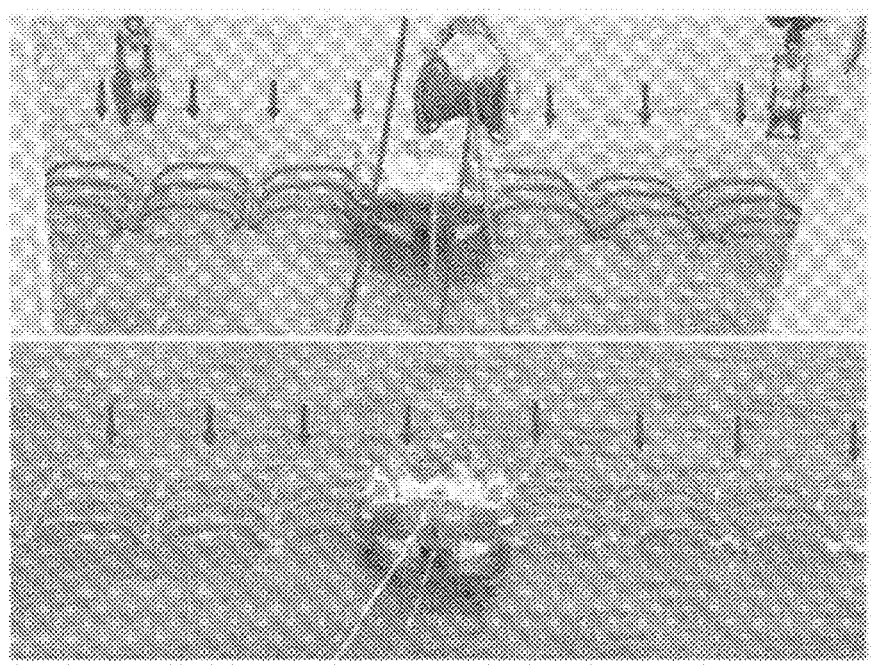
Figure 3:
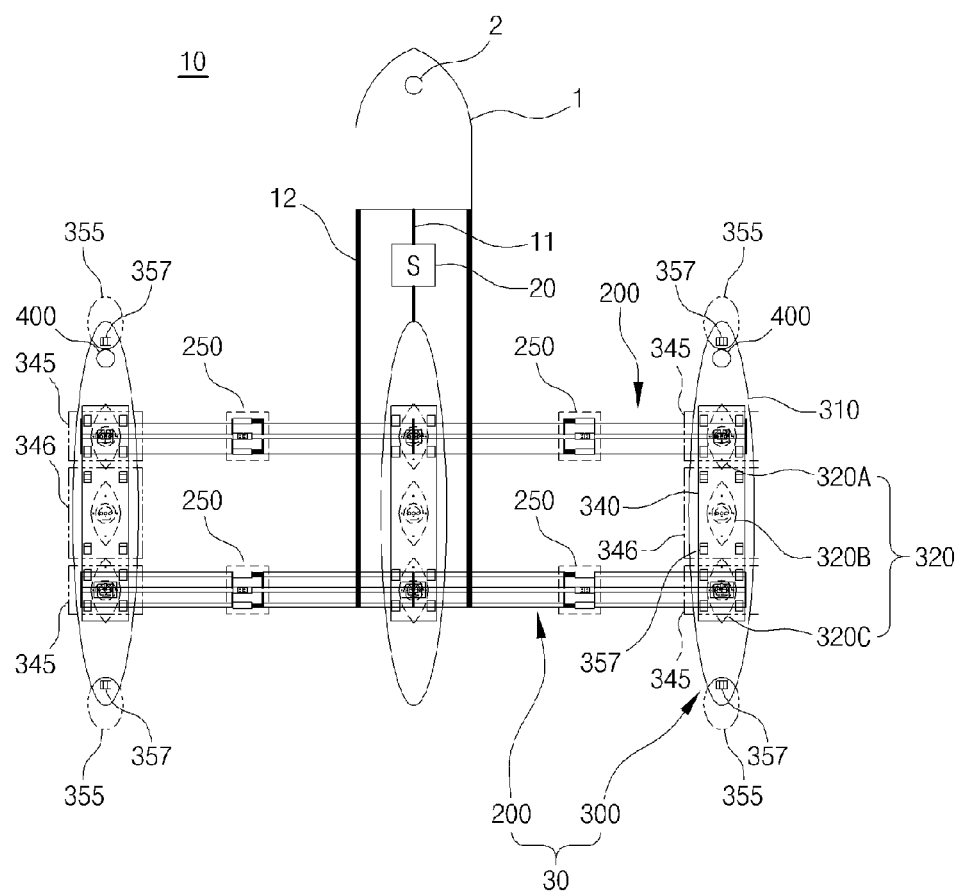
FIG. 3 is a view showing the configuration of a foldable-fixing type 3D seismic survey apparatus for a small ship according to an embodiment of the present invention.

FIG. 3 is a view showing the configuration of a foldable-fixing type 3D seismic survey apparatus 10 for a small ship according to an embodiment of the present invention.

As shown in FIG. 3, the foldable-fixing type 3D seismic survey apparatus 10 includes a seismic wave generator 20 that is towed from the stern of a small ship 1 and generates seismic waves and a seismic unit 30 that is stowed behind the stern with the position relative to the stern of the small ship 1 fixed and is deployed at a 3D seismic survey location after being transported in a folded state to the survey location to receive seismic waves reflected off the seafloor.

In this configuration, the small ship 1 may be equipped with a ship GPS device 2 to provide a reference location of the entire foldable-fixing type 3D seismic survey apparatus 10. The ship GPS device 2 acquires location information of the ship 1 and provides the location information as reference location information for the seismic unit 30 to analyze seismic waves for a 3D seismic survey while a 3D seismic survey is performed on submarine topography.

The seismic wave generator 20 generates and sends out seismic waves for obtaining an image of submarine topography or a 3D image. In detail, the seismic wave generator 20 may be an air gun to generate seismic waves when compressed air is supplied.

The seismic unit 30 can perform a 3D seismic survey using at least two GPS devices and is minimally or not deformed during a 3D seismic survey to increase accuracy. To this end, the seismic unit 30 includes a plurality of floating board units 300 that is equipped with seismometer units 320 on the bottoms thereof to be submerged in water, and foldable fixing-frames 200 that connect and fix the floating board units 300 to each other in a floating board unit array such that relative positions of the floating board units 300 are fixed, and that are folded to transport the seismic unit 30 and are unfolded at a survey location.

Figure 4:
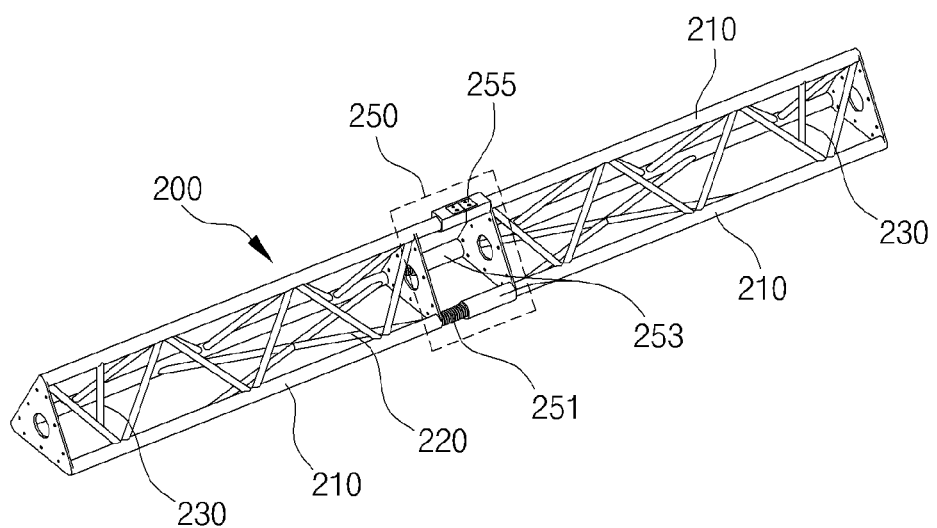
FIG. 4 is a view showing the configuration of a foldable fixing-frame in the configuration shown in FIG. 3.

FIG. 4 shows the configuration of a foldable fixing-frame 200 in the configuration shown in FIG. 3.

The foldable fixing-frame 200 includes: a plurality of fixing bars 210 that are straight steel pipes and separated into several parts; support bars 220 that are orthogonally connected to adjacent fixing bars 210 in zigzag shapes among the fixing bars 210 to firmly support the fixing bars 210; and folding parts 250 that include a hinge portion 255 formed for folding/unfolding at a separate end of one fixing bar 210, bolt portions 251 formed at separate ends of the other fixing bars, and sliding nut pipes 253 movably fitted on bolt portions 251 connected to the bolt portions 251. Accordingly, when the two or more separate fixing bars 210 that are fixing pipes are unfolded by the hinge portion 255 of the folding part 250 and then the bolt portions 251 and the sliding nut pipes 253 are fitted to each other, a fixed foldable fixing-frame 200 is completed. Further, the foldable fixing-frame 200 may further include vertical fixing bars 230 that are vertically coupled to floating boards 310 to prevent sliding and increase fixing force when the floating board units 300 are coupled to the foldable fixing-frame 200.

In this configuration, the fixing bars 210 are coupled to each other in a truss structure by the support bars 220 in order to increase deformation resistance so that the foldable fixing-frame 200 is prevented from bending due to pressure by a current, for example.

According to this configuration, when the floating board units 300 are coupled to the foldable frames 200, the relative positions of the floating board units 300 are fixed during a 3D seismic survey. Further, the foldable fixing-frames 200 are folded to reduce the size in order to transport the seismic unit 30 to a survey location and then are unfolded and firmly fixed by the hinge parts 250 at the survey location, whereby the seismic unit 30 is completed such that the relative positions of seismometer units 320 are fixed. Accordingly, when one GPS device on the seismic unit 30 is known, the locations of the other seismometer units 320 can be obtained from the relative location relationship, so it is possible to minimize the number of GPS devices for obtaining location information of the seismometer units 320.

Figure 5A:
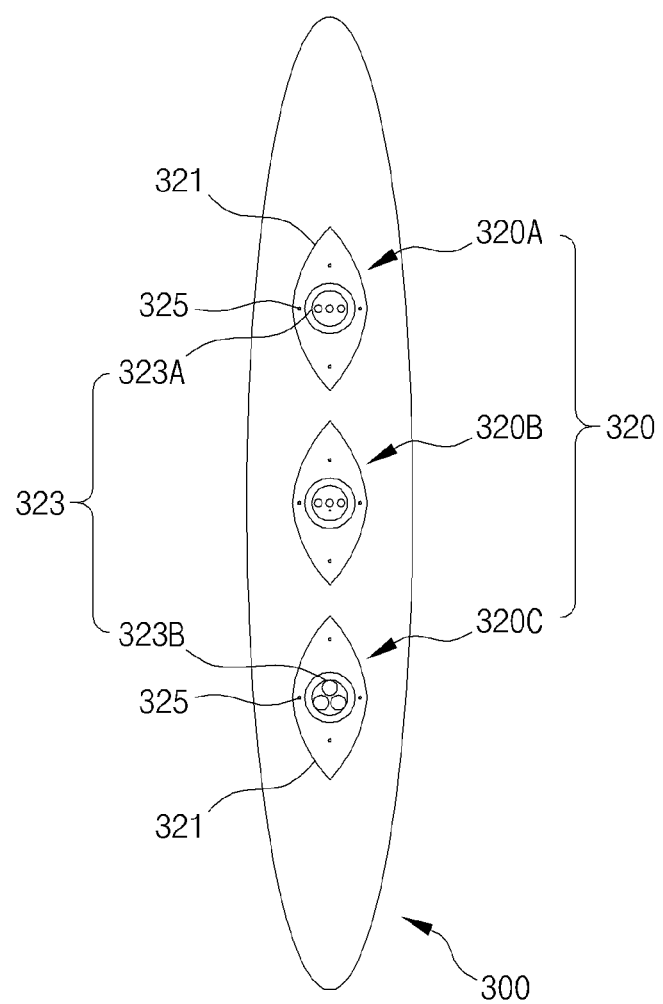
FIGS. 5A and 5B are a bottom view of a floating board equipped with seismometer units and a plan view of the floating board equipped with a fixing-frame base.
Figure 5B:
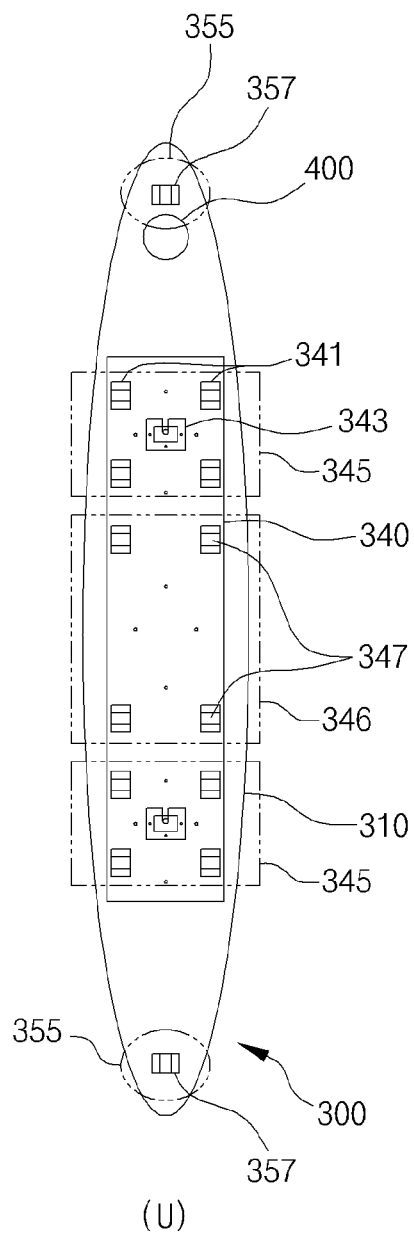

FIGS. 5A and 5B are a bottom view of a floating board 310 equipped with a seismometer unit 320 (320A, 320B, 320C) and a plan view of the floating board 310 equipped with a fixing-frame support 340.

As shown in FIGS. 5A and 5B, the floating board unit 300 includes: one or more seismometer units 320 (a first seismometer unit 320A, a second seismometer unit 320B, and a third seismometer unit 320C); a fixing-frame base 340 for fixing the foldable fixing-frames 200; and one or more board GPS devices 400 for supplying the location information of the seismometer units 320 (the first seismometer unit 320A, the second seismometer unit 320B, and the third seismometer unit 320C).

The floating board 310, which is a floater having a streamlined plate shape such as a surf board, is configured to be able to be towed by the small ship 1 on water.

As shown in the bottom view of the floating board 310 in FIG. 5A, the seismometer units 320 (the first seismometer unit 320A, the second seismometer unit 320B, and the third seismometer unit 320C) that receive seismic waves reflected from submarine topography are fixed to the bottom of the floating board 310. The detailed configuration of the seismometer units 320 (the first seismometer unit 320A, the second seismometer unit 320B, and the third seismometer unit 320C) will be described with reference to FIGS. 6 and 7.

As shown in the plan view of the floating board 310 in FIG. 5B, the fixing-frame base 340 is a steel plate having a plurality of fixing-frame holder units 345 that include: fixing bar holders 341 in which the fixing bars 210 of the foldable fixing-frames 200 are inserted and fixed to be arranged with a predetermined gap in the longitudinal direction of the floating board 310; and a vertical bar holder 343 that is positioned at the center inside the fixing bar holders 341, which are vertically coupled to the floating board 310, in order to prevent sliding on the floating board 310 and increase fixing force.

Further, when the fixing-frame base 340 is mounted on one of the floating boards 310 at both sides of the seismic unit 30, the fixing-frame base 340 includes a lateral coupling part 346 at the center portion, which includes lateral extension bar holders 347 for holding lateral extension bars 350

(see FIG. 11) for extending the seismic unit 30 laterally, that is, perpendicularly to the traveling direction of a ship, and longitudinal extension parts 355 that each include a longitudinal extension bar holder 357 for coupling a longitudinal extension bar 360 (see FIG. 11) to connect seismic units 30 in the traveling direction of a ship.

The fixing-frame bases 340 are longitudinally fixed on the tops of the floating boards 310. Accordingly, it is possible to complete the floating board units 300 by connecting the floating boards 310 with their relative positions fixed using the foldable fixing-frames 200.

The board GPS device 400 is disposed at a specific position on the floating board 310 and acquires location information, so it is possible to locate the seismometer units 320 (320A, 320B, 320C) during a 3D seismic survey on the basis of the acquired location information and relative position information of the board GPS device 400 and the seismometer units 320 (320A, 320B, 320C) on the floating board 310.

In detail, when the ship GPS device 2 is provided, the board GPS device 400 can be provided to only one of the floating boards 310. Accordingly, it is possible to acquire location information of the seismometer units 320 (the first seismometer unit 320A, the second seismometer unit 320B, and the third seismometer unit 320C) using the location information acquired by the board GPS device 400 and the location information acquired by the ship GPS device 2, and to analyze received 3D seismic waves. The location information of the ship GPS device 2 is used to acquire directional information for location determination calculation using the positions of the seismometer units 320 (the first seismometer unit 320A, the second seismometer unit 320B, and the third seismometer unit 320C) relative to the board GPS device 400.

However, when the ship GPS device 2 is not provided, the board GPS device 400 may be mounted on each of the floating board 310 at both sides, and if necessary, three ore more board PGS devices may be provided to be mounted on three or more floating boards 310.

Figure 6:
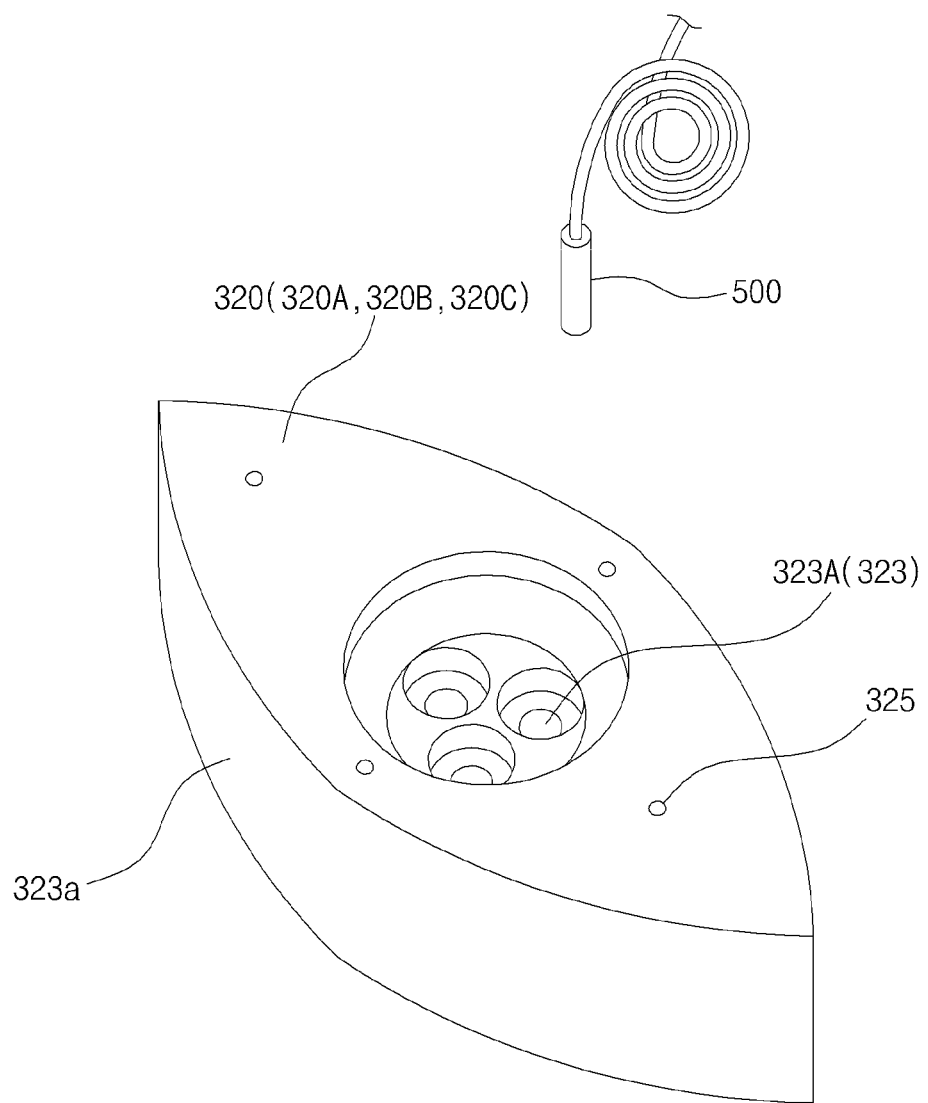
FIGS. 6 and 7 are perspective views of the seismometer units for mounting seismometers having various sizes.
Figure 7:
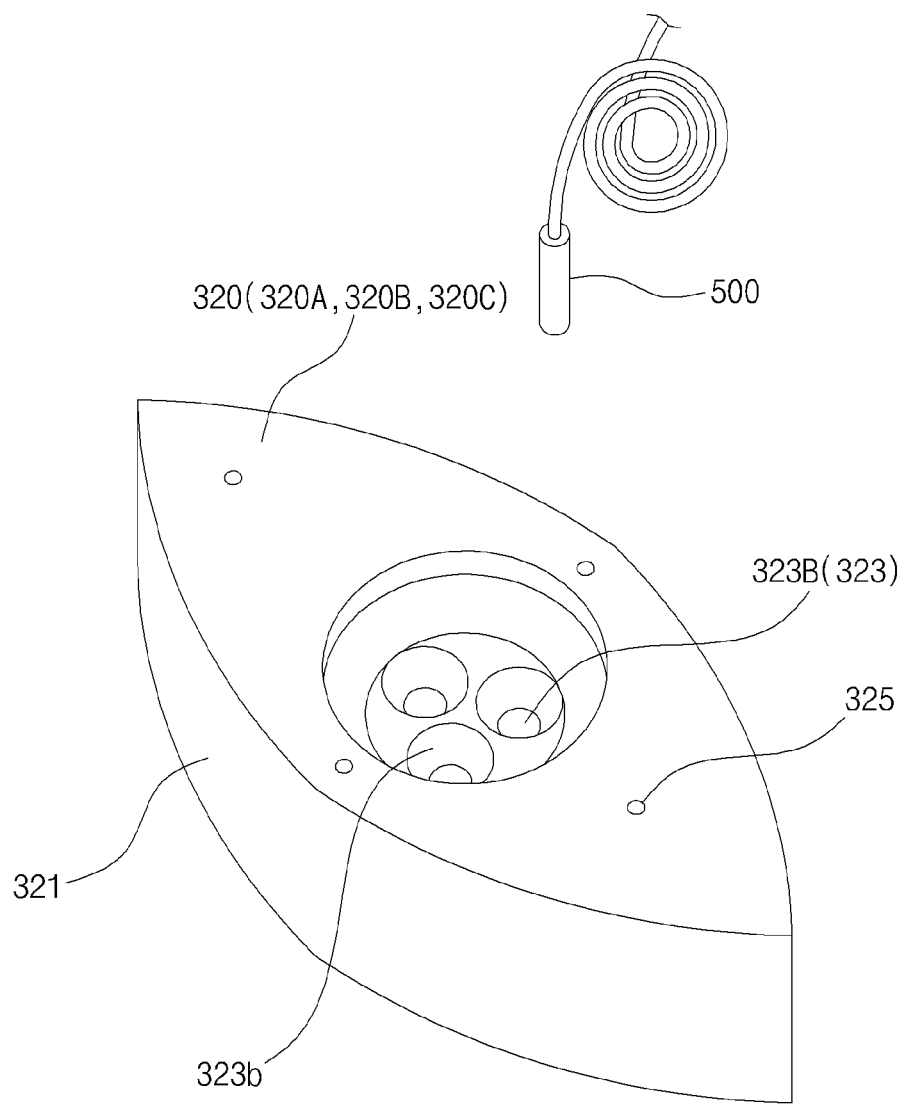

FIGS. 6 and 7 are perspective views of the seismometer units 320 (320A, 320B, 320C) for mounting seismometers having various sizes.

As shown in FIGS. 6 and 7, the seismometer units 320 (the first seismometer unit 320A, the second seismometer unit 320B, and the third seismometer unit 320C) each include a seismometer retainer 321 having a plurality of seismometer holes 323 where seismometers are mounted, and seismometers 500 mounted in the seismometer holes 323 (first seismometer holes 323A and second seismometer holes 323B).

The seismometer retainer 321 of the seismometer units 320 (the first seismometer unit 320A, the second seismometer unit 320B, and the third seismometer unit 320C) is made of reinforced plastic and has the seismometer holes 323 (323A and 323B) cylindrically formed on the bottom so that the seismometers 500 are vertically disposed in the seismometer retainer 321. In an embodiment of the present invention, the seismometer units 320 (the first seismometer unit 320A, the second seismometer unit 320B, and the third seismometer unit 320C) are elliptical streamlined bodies having front and rear edges in a horizontal cross-section to minimize resistance against water. After the seismometers 500 are mounted in the seismometer holes 323 (323A and 323b), they are fixed, for example, by silicon to prevent vibration from being transmitted between the seismometer retainers 321 and the seismometers 500, thereby minimizing vibration transmitted to the seismometers 500 from a survey frame.

The seismometer holes 323 (323A and 323B) have conical portions 323a and 323b, respectively, which are formed by cutting the inlets in a conical shape to further collect seismic waves reflected from the seafloor.

Further, as shown in FIG. 6, omni hydrophones as seismometers are mounted in the first seismometer holes 323A having a small diameter of the seismometer holes 323, and as shown in FIG. 7, directional hydrophones as seismometers are mounted in second seismometer holes 323B having a relatively large diameter, so there is no need for using a streamer for a 3D seismic survey. There are three types of hydrophones generally used for marine surveys: a streamer type hydrophone, an omni hydrophone that can receive seismic wave signals in all directions, and a directional hydrophone that receives seismic wave signals approaching in specific directions. The present invention addresses two kinds of hydrophones except the streamer type of hydrophone because the invention does not use a streamer.

As in FIGS. 5A and 5B in which three seismometer units 320 (the first seismometer unit 320A, the second seismometer unit 320B, and the third seismometer unit 320C) are mounted on the bottom of a floating board 310, a plurality of seismometer units may be mounted on the bottom of the floating board 310, depending on required accuracy for a 3D seismic survey. The seismometer units 320 may be longitudinally arranged in the towing direction, similar to a streamer that is an array of seismometers applied to a 3D seismic survey for submarine topology, but if necessary, they may be arranged perpendicular to the towing direction.

The seismometer units 320 are coupled to the bottom of the floating board 310 by tightening fasteners such as bolts into the floating board 310 through seismometer-fixing holes 325. As described above, since the seismometer units 320 (the first seismometer unit 320A, the second seismometer unit 320B, and the third seismometer unit 320C) coupled to the bottom of the floating board 310 are submerged in water during a 3D seismic survey, inflow of noise such as noise due to surges or waves on the surface of water or seismic wave noise generated on the water is minimized. Accordingly, inflow of noise other than seismic waves generated by the seismic wave generator and reflected from submarine topography is minimized during a 3D seismic survey on the submarine topography for a narrow sea area, so it is possible to perform an accurate 3D seismic survey of submarine topography.

Figure 8:
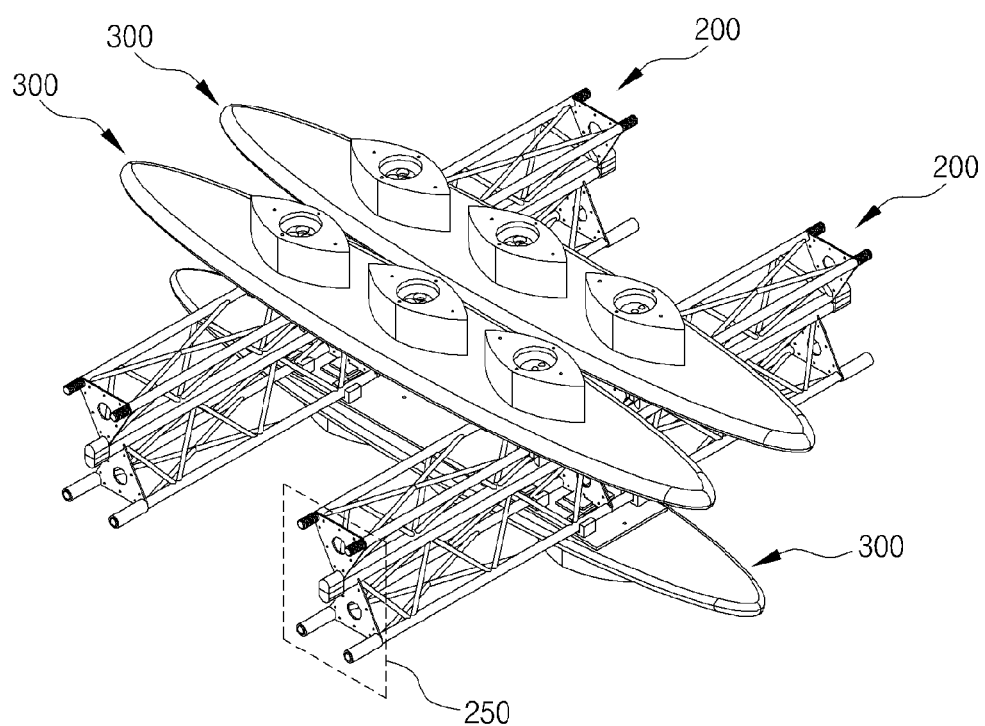
FIGS. 8 and 9 are a perspective view and a front view of a seismic unit folded to reduce the size after floating board units are fixed to foldable fixing-frames.
Figure 9:
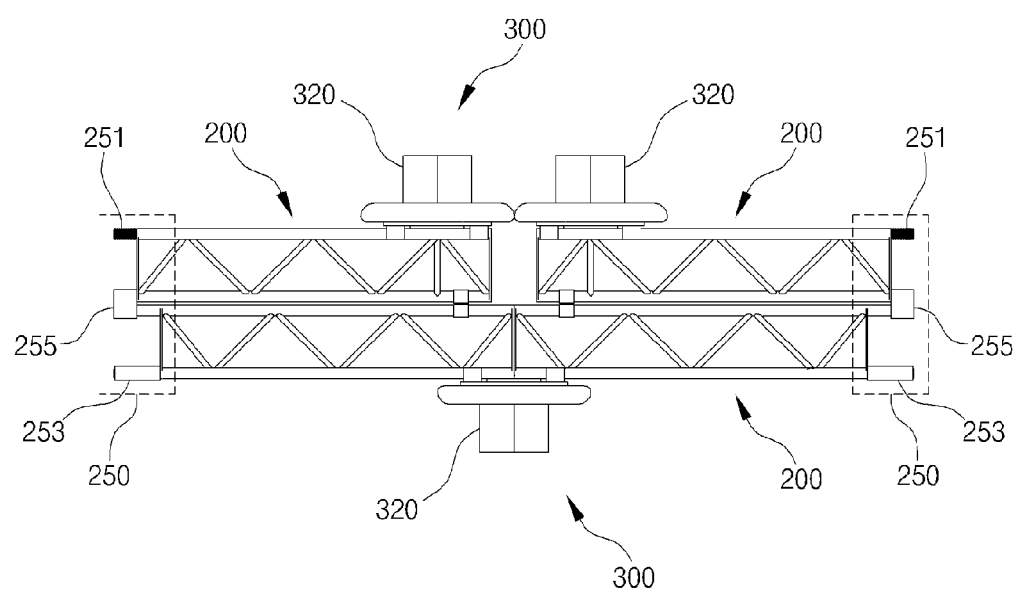
Figure 10:
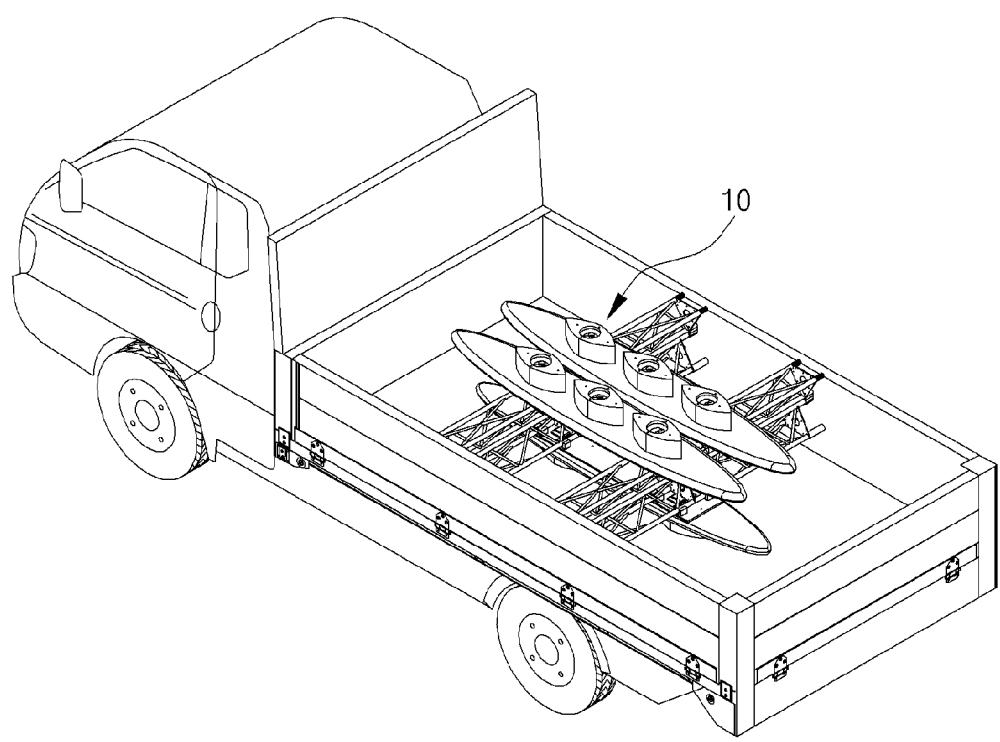
FIG. 10 is a view showing a foldable-fixing type 3D seismic survey apparatus folded and loaded on a truck.
Figure 11:
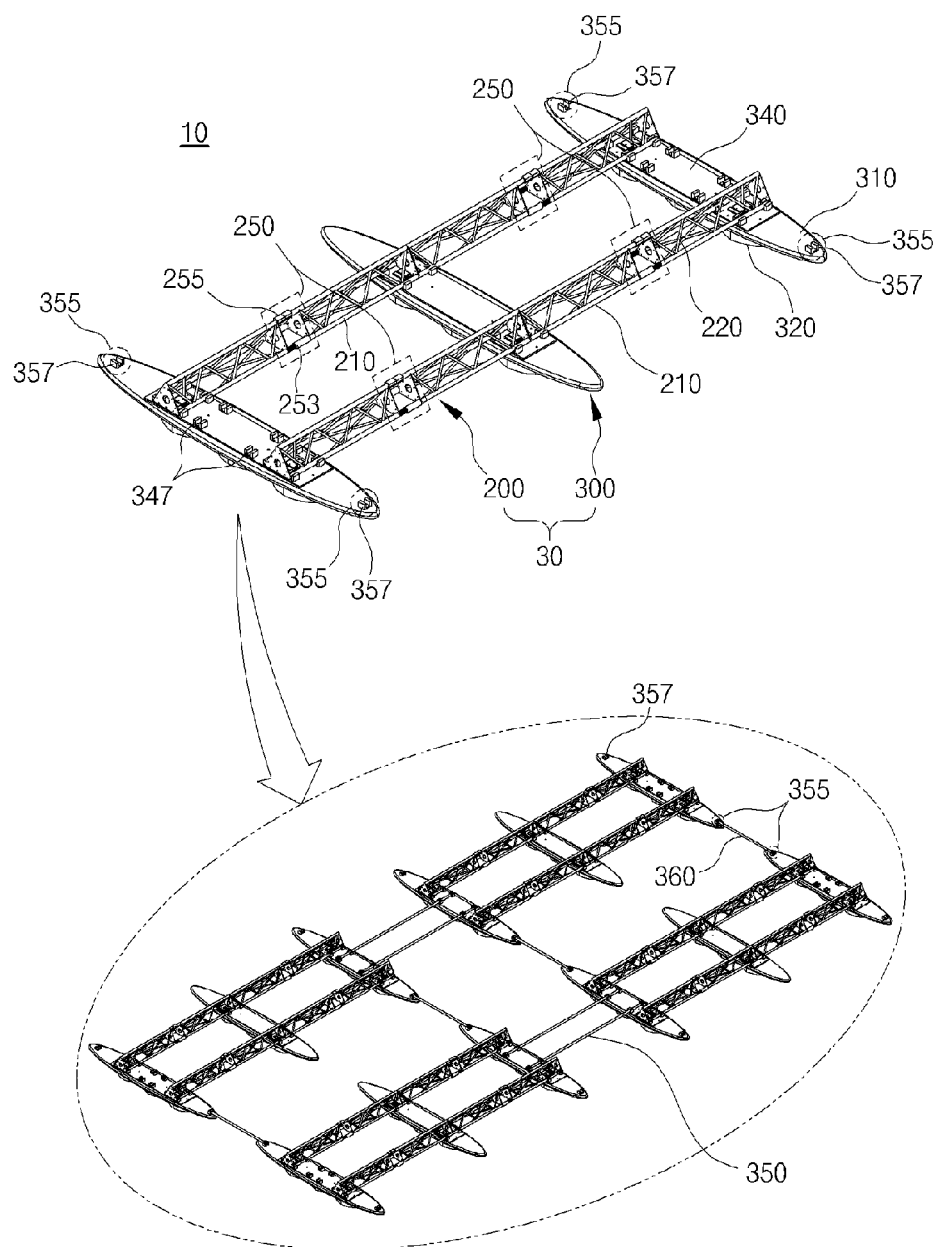
FIG. 11 is a perspective view of the seismic unit fixed with the foldable fixing-frame unfolded at a desired position for a 3D seismic survey after the floating board units are fixed by the foldable fixing-frame.

FIGS. 8 and 9 are a perspective view and a front view the seismic unit 30 folded to reduce the size after the floating board units 300 are fixed to the foldable fixing-frames 200, FIG. 10 is a view showing the foldable-fixing type 3D seismic survey apparatus 10 folded and loaded on a truck, and FIG. 11 is a perspective view of the seismic unit 30 fixed with the foldable fixing-frame 200 unfolded at a desired position for a 3D seismic survey after the floating board units 300 are fixed by the foldable fixing-frame 200.

As shown in FIGS. 8 and 9, in order to transport the seismic unit 30 to a survey location, the seismic unit 10 is reduced in size by loosening the bolt portions 251 and the sliding nut pipes 253 of the hinge parts 250 and then folding the foldable fixing-frames 200. Thereafter, the seismic unit 10 is loaded on a small truck.

The foldable-fixing type 3D seismic survey apparatus 10 shown in FIG. 3 includes three floating boards 310 each having three seismometer units (the first seismometer unit 320A, the second seismometer unit 320B, and the third seismometer unit 320C).

When the gap between seismometers 500 is set, the gap between submarine reflecting surfaces, that is, image points substantially obtained after a survey is half of the gap between the seismometers. Accordingly, when seismometers are arranged in the survey direction, it is possible to load and carry three seismometers with a gap of about 1 m, considering that when a floating system is used by using a surf board, which can be easily machined in a common machining factory without a system such as a large lathe, the size is about 1.7~2.5 m. Further, the 3D seismic survey apparatus 10 is around 1 m high when folded and loaded, so the apparatus can be manufactured such that three or more apparatuses can be loaded and transported by common trucks.

Considering, in general, that a common 1 ton truck is about 1.6 m wide and a 1.4 ton truck is 1.7 m wide and considering the width of a floater after being manufactured, it is possible to set a gap of about 1.4 m of seismic boards or seismometers in consideration of the width of the foldable-fixing type 3D seismic survey apparatus 10 when it is folded, which means the gap between submarine image points is about 0.7 m.

The fact that the apparatus can be manufactured such that the gap of submarine reflection image points in the survey direction and the direction perpendicular to the survey direction is 0.5 m or more is meaningful for a seismic survey, it may be general to set a lattice gap to about 0.5 m after processing the final survey data, considering the frequency of a source and the gaps between resolutions in a marine survey. Therefore, it may be considered that the system provides a reasonable seismometer array even in terms of acquiring and processing survey data.

That is, the present invention can provide a foldable-fixing type 3D seismic survey apparatus for a small ship, whereby the apparatus is practical for acquiring seismic data and providing images, and can be easily transported and stowed even by common vehicles, and a method of 3D seismic survey using the foldable-fixing type 3D seismic survey apparatus.

Thereafter, after the apparatus arrives at a survey location, the unfolded seismic unit 30 shown in FIG. 11 is completed by unfolding the foldable fixing-frames using the hinge parts 255 and tightening the bolt portions 251 into the sliding nut pipes 253.

Therefore, the seismic unit 30 is fixed to the stern of the small ship 1 together with the seismic wave generator 20 by a rigid wire so that the relative positions of the seismometer units 320 are fixed. In detail, as shown in FIG. 11, the seismic wave generator 20 is connected to the small ship 1 having the configuration described above by a wire 11, or a rigid body such as a rigid pipe or a rigid bar such as a towing steel member 12 when fixing relative positions. Further, the seismic unit 30 is also connected to the small ship 1 by a rigid body such as the towing rigid member 12 with the relative position to the small ship fixed.

In this case, two or more fixing-frames 200 may be used to connect the floating board units 300 so that the relative positions of the small ship 1, the seismic wave generator 20, and the floating boards 310 are firmly fixed.

Further, the seismic unit 30 can be easily laterally extended by coupling the lateral extension bars 250 to the lateral extension bar holders 347 of the lateral coupling parts 346, and can be easily longitudinally extended by coupling the longitudinal extension bars 360 to the longitudinal extension bar holders 357. In this configuration, the survey channels are a multiple of the number of times of coupling. In an embodiment of the present invention, if the seismic unit 30 has a specific number of survey channels, the survey channels are expanded when one seismic unit 30 is connected, and when N seismic units 30 are added, the number of survey channels are increased to N times of the survey channels of one seismic unit 30.

Accordingly, it is possible to scan a wider undersea area by performing a 3D seismic survey one time, so it is possible to more efficiently perform a 3D seismic survey.

Figure 12:
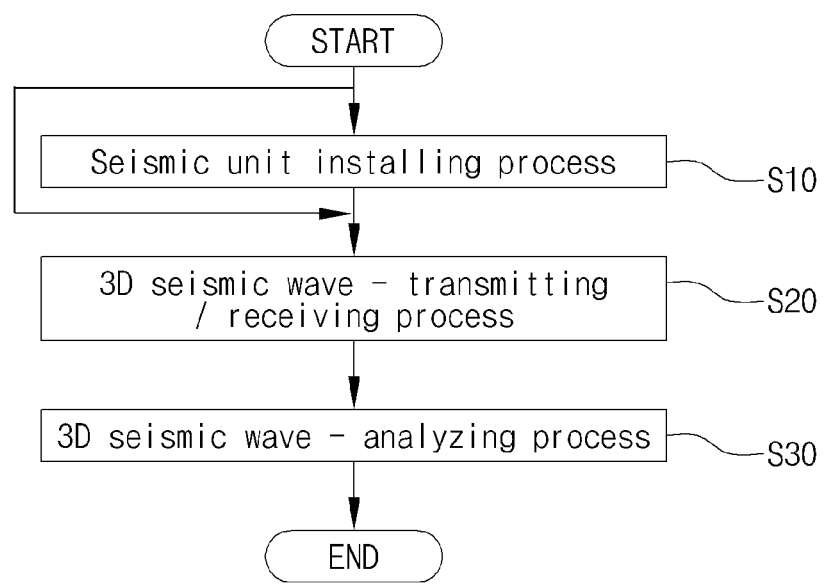
FIG. 12 is a flowchart illustrating a process of a 3D seismic survey method using the foldable-fixing type 3D seismic survey apparatus for a small ship according to an embodiment of the present invention.

FIG. 12 is a flowchart illustrating a process of a 3D seismic survey method using the foldable-fixing type 3D seismic survey apparatus for a small ship according to an embodiment of the present invention.

There is provided, as shown in FIG. 12, a method of a 3D seismic survey using the foldable-fixing 3D seismic survey apparatus for a small ship whereby the seismic unit of the apparatus includes: the seismic wave generator 20 that is towed behind the stern of the small ship 1; the floating board units 300 including the floating boards 310 that are equipped with one or more seismometer units 320 (320A, 320B, 320C), which are submerged in water, on the bottom, and that have relative positions; and the foldable fixing-frames that connect the floating boards into an array of floating boards of which the relative positions are fixed, that are folded for transporting, and receives 3D seismic waves while being towed behind the seismic wave generator after being unfolded at a survey location. The method includes 3D seismic wave-transmitting & receiving (S20), and 3D seismic wave-analyzing (S30).

Seismic unit-installing (S10) is to complete the seismic unit 30 by fixing the relative positions between the small ship 1, which tows the seismic wave generator 20 and the floating board units 300, and the floating boards 310 by unfolding and fixing the foldable fixing-frames 200 with the floating board units 300 mounted thereon.

3D seismic wave transmitting & receiving (S20) is to transmit 3D seismic waves to the seafloor through the seismic wave generator 20 while towing the seismic wave generator 20 and the seismic unit 30 with the small ship 1 and to receive 3D seismic waves reflected off the seafloor using the seismometer units 320 (320A, 320B, 320C).

3D seismic wave-analyzing (S30) is to acquire 3D submarine topography information by analyzing the received 3D seismic waves using the relative positions between the small ship 1 and the floating boards 310 and the information of the board GPS devices 400 on the seismic unit 30.

3D seismic wave-analyzing (S30) may be performed using two or more board GPS devices 400 on the seismic unit 30 or may be performed using GPS information acquired by one board GPS device 400 on the seismic unit 30 or GPS information acquired by the ship GPS device 2 on the small ship 1, in which the number of GPS devices is minimized.

Since the foldable-fixing type 3D seismic survey apparatus for a small ship according to the present invention uses a foldable fixing-structure instead of towed-hose streamers, which are used for surveys in the related art, it is possible to solve the basic problem of non-uniformity of gaps between streamers due to flexibility of the streamers that use rubber hoses as protective equipment capable of blocking water currents in a traveling direction for a survey in the related art.

Further, according to the present invention, the positions between seismometers are completely fixed, so it is possible to reduce the number of GS devices required. Furthermore, the relative positions are maintained in any case, so it is possible to accurately and easily perform a 3D seismic survey using a small ship in shallow areas and narrow areas with many fishing nets and fishing instruments by basically removing the problem of entangling or twisting of long streamers, which have been used for conventional 3D seismic survey apparatuses.

Further, the foldable-fixing type 3D seismic survey apparatus for a small ship and the method of 3D seismic survey using the foldable-fixing type 3D seismic survey apparatus of the present invention make it possible to collect as many image signals as existing 3D seismic survey apparatuses using streamers, by providing extendibility in a traveling direction (inline direction) of a survey ship or a perpendicular direction to the traveling direction (crossline direction).

Further, the foldable-fixing type 3D seismic survey apparatus for a small ship and the method of 3D seismic survey using the foldable-fixing type 3D seismic survey apparatus of the present invention can perform a 3D seismic survey with a small ship in shallow areas and narrow areas and can easily provide extendibility in a traveling direction (inline direction) of a survey ship or a perpendicular direction to the traveling direction (crossline direction) using a foldable fixing-frame instead of existing streamers that cannot provide extendibility in the perpendicular direction to the traveling direction of a survey ship, whereby a one-time survey area is expanded and efficiency of a 3D seismic survey is increased.

Further, according to the foldable-fixing type 3D seismic survey apparatus for a small ship and the method of 3D seismic survey using the foldable-fixing type 3D seismic survey apparatus of the present invention, since seismic systems with a plurality of survey channels can be connected perpendicular to and in parallel with each other, it is possible to acquire survey data through one-time survey corresponding to a multiple of the survey channels.

Further, the foldable-fixing type 3D seismic survey apparatus for a small ship and the method of 3D seismic survey using the foldable-fixing type 3D seismic survey apparatus of the present invention use foldable fixing-frames of which relative positions are fixed, so it is possible to obtain sufficiently reliable survey information with only two GPS devices, and it is possible to improve efficiency of a survey because there is no possibility that streamers can be twisted, unlike in the conventional art.

Further, the invention title is a foldable-fixing type 3D seismic survey apparatus for a small ship and a method of 3D seismic survey using the foldable-fixing type 3D seismic survey apparatus, and the foldable-fixing type 3D seismic survey apparatus for a small ship and the method of 3D seismic survey using the foldable-fixing type 3D seismic survey apparatus were described through an embodiment, but the number of survey channels can be variously selected, depending on requirements for extension, without a limit.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A foldable-fixing type 3D seismic survey apparatus for a small ship, the apparatus comprising:
    a seismic wave generator that is towed from a stern of the small ship and generate seismic waves; and
    a seismic unit (a) including (1) a plurality of floating board units equipped with one or more seismometer units on bottoms thereof to be submerged in water and (2) foldable fixing-frames connecting and fixing the floating board units to each other in a floating board unit array such that relative positions of the floating board units are fixed, and being folded for transporting and being unfolded for installation, and (b) receiving 3D seismic waves while being towed behind the seismic wave generator after being moved and unfolded at a survey location,
    wherein,
        the seismic wave generator and the seismic unit are connected and fixed to the small ship with relative positions to the small ship fixed.

2. The apparatus of claim 1, wherein the floating board unit includes:
    a floating board made of a floating material in a plate shape;
    a plurality of the seismometer units mounted on a bottom of the floating board to be submerged in water during a 3D seismic survey and receiving 3D seismic waves reflected off a seafloor;
    a fixing-frame base disposed on a top of the floating board to fix the fixing-frame; and
    one or more board GPS devices respectively disposed on one or more of the floating boards.

3. The apparatus of claim 2, wherein the seismic unit includes:
    a lateral coupling part including one or more lateral extension bar holders disposed on outermost floating boards; and
    one or more lateral extension bars coupled to the one or more lateral extension bar holders to extend the seismic unit in a direction perpendicular to a traveling direction of a ship.

4. The apparatus of claim 2, wherein the seismic unit includes:
    longitudinal coupling parts including one or more longitudinal extension bar holders, at front and rear portions of each of outermost floating boards; and
    one or more longitudinal extension bars coupled to the one or more longitudinal extension bar holders to extend the seismic unit in a traveling direction of a ship.

5. The apparatus of claim 1, wherein the seismic unit includes three or more floating board units to acquire a 3D seismic wave image.

6. The apparatus of claim 1, wherein the seismic unit includes a seismometer retainer having a plurality of seismometer holes in which a plurality of the seismometers are disposed.

7. The apparatus of claim 6, wherein the seismometer holes are formed in conical shapes at inlets to collect seismic waves reflected from a seafloor.

8. The apparatus of claim 1, wherein the foldable fixing-frame includes:
    two or more fixing bars separated into several parts;
    support bars orthogonally connected among the two or more fixing bars; and
    a folding part including a hinge portion formed for folding and unfolding at a separate end of one of the fixing bars, bolt portions formed at the separate ends of the other fixing bars, and a sliding nut pipe fitted on any one of the bolt portions.

9. The apparatus of claim 8, wherein the folding parts are adjusted in gap to fit to a size of a truck for loading, and the seismometers are adjusted in gap to fit to sizes of the floating boards and a truck for loading, and are attached.

10. A method of a 3D seismic survey using a foldable-fixing type 3D seismic survey apparatus for a small ship, the apparatus including: a seismic wave generator being towed from a stern of the small ship and generating seismic waves; and a seismic unit (a) including (1) a plurality of floating board units equipped with one or more seismometer units on bottoms thereof to be submerged in water and (2) foldable fixing-frames connecting and fixing the floating board units to each other in a floating board unit array such that relative positions of the floating board units are fixed, and being folded for transporting and being unfolded for installing, and (b) receiving 3D seismic waves while being towed behind the seismic wave generator after being moved and unfolded at a survey location, the method comprising:

3D seismic wave-transmitting and receiving in which 3D seismic waves are transmitted and received while towing the seismic wave generator and the seismic unit with the small ship; and 3D seismic wave-analyzing in which submarine topography information is acquired by analyzing the received 3D seismic waves using fixed relative positions between the small ship and the floating boards and GPS information of board GPS devices on the seismic unit.

11. The method of claim 10, wherein the 3D seismic wave-analyzing is performed using GPS information of one of the GPS devices on the seismic unit and ship GPS information of the small ship, or using GPS information of two or more board GPS devices on the seismic unit.

\* \* \* \* \*